United States Patent Office 3,330,963
Patented July 11, 1967

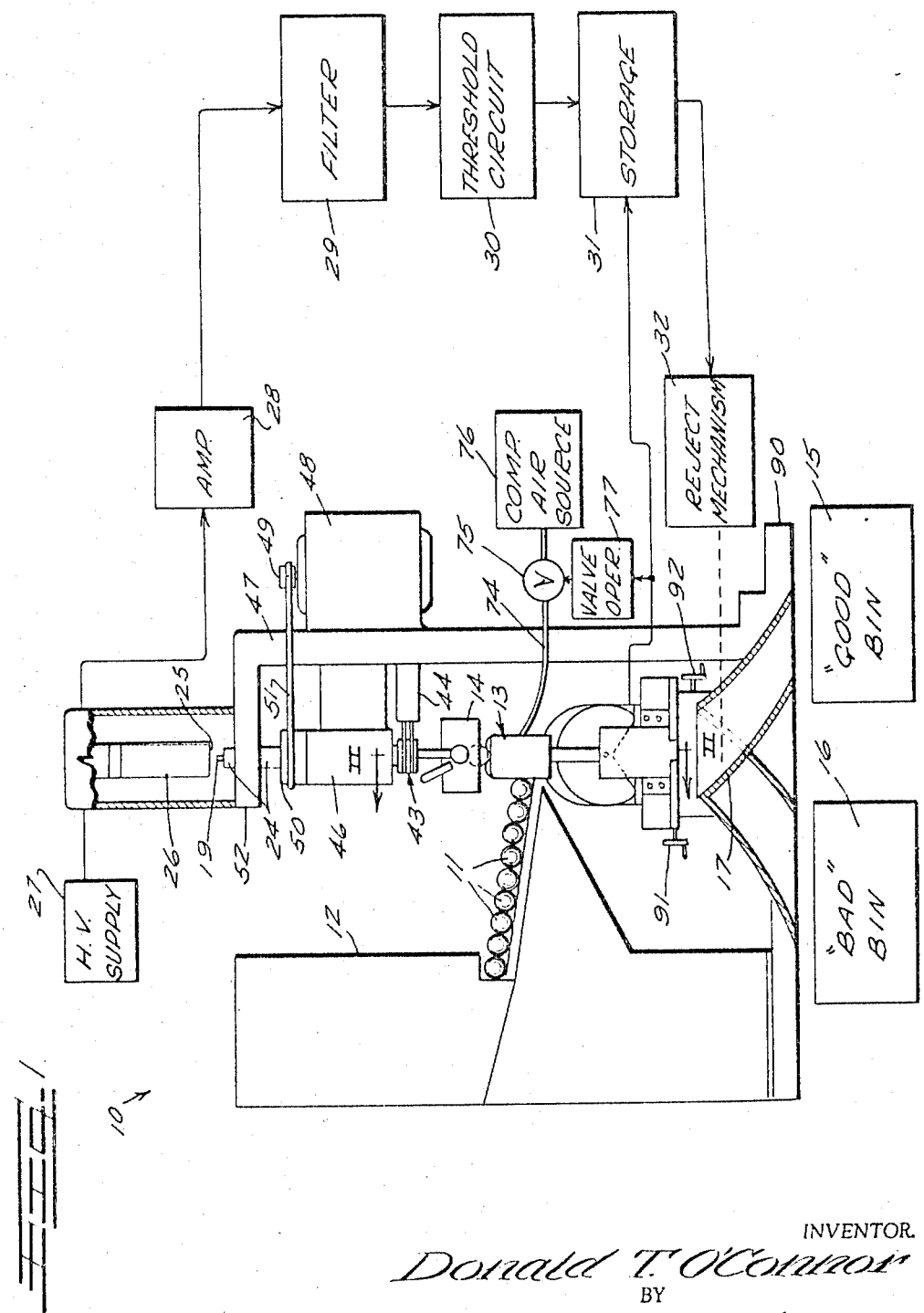

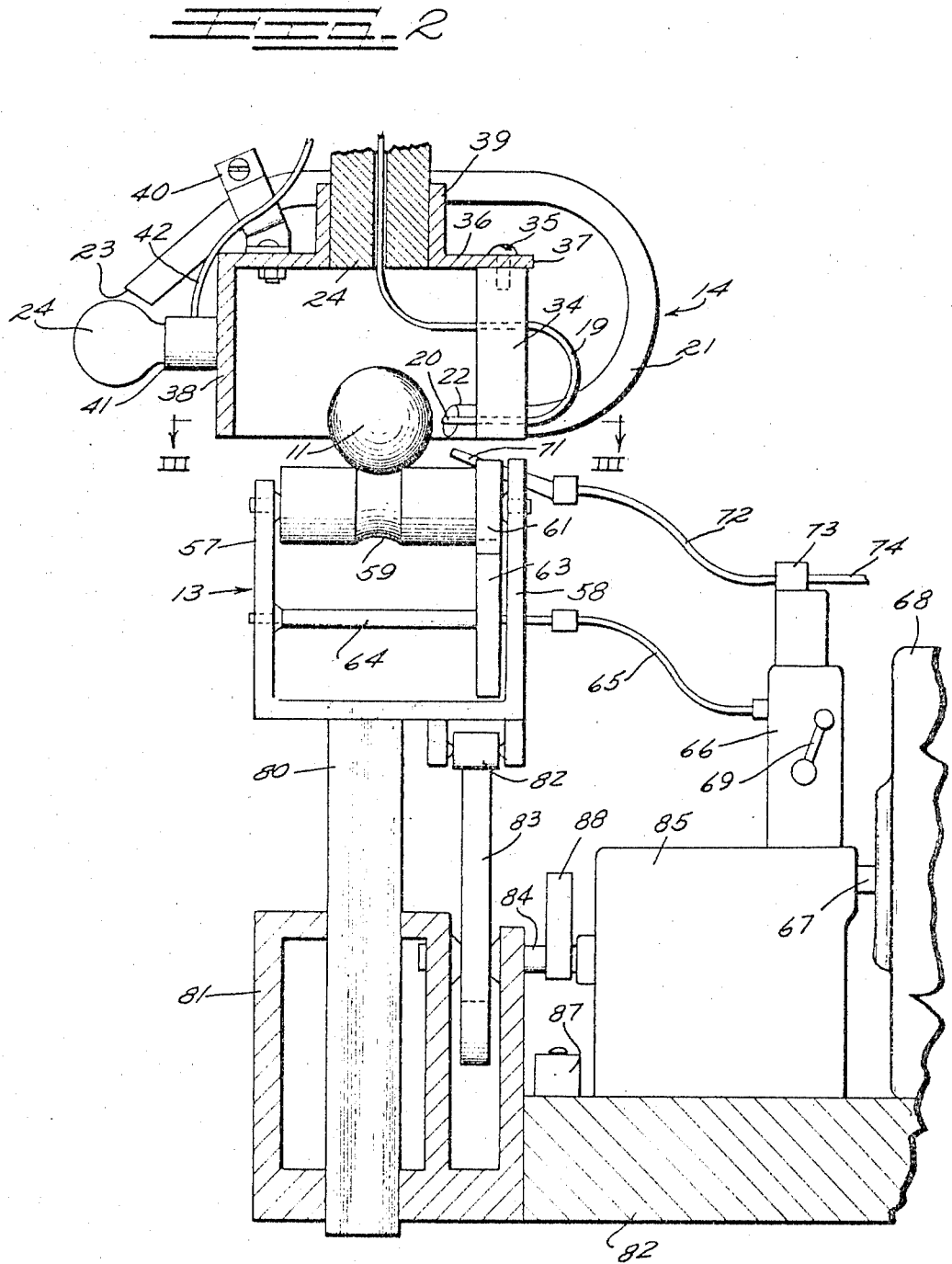

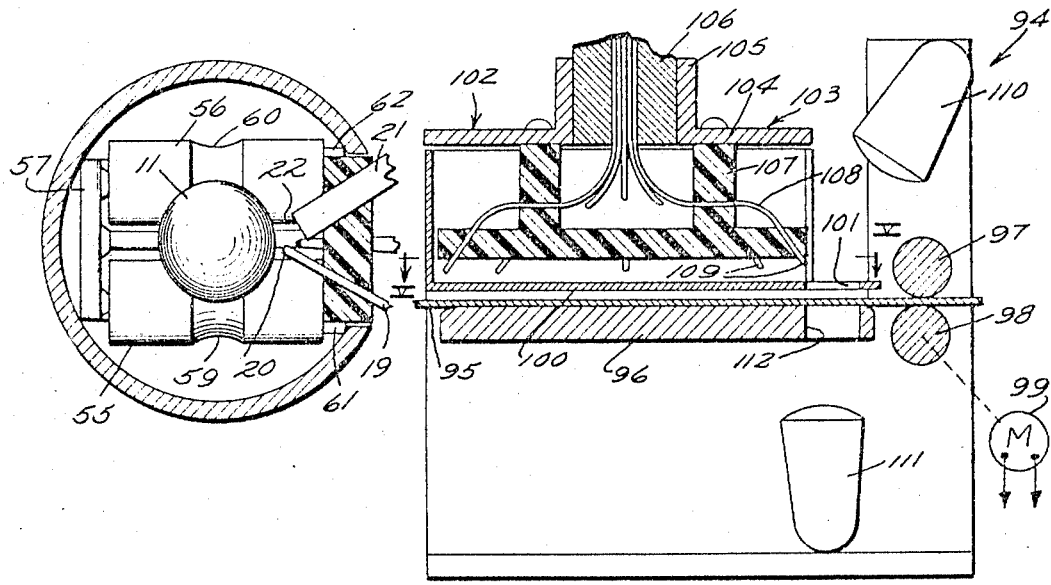
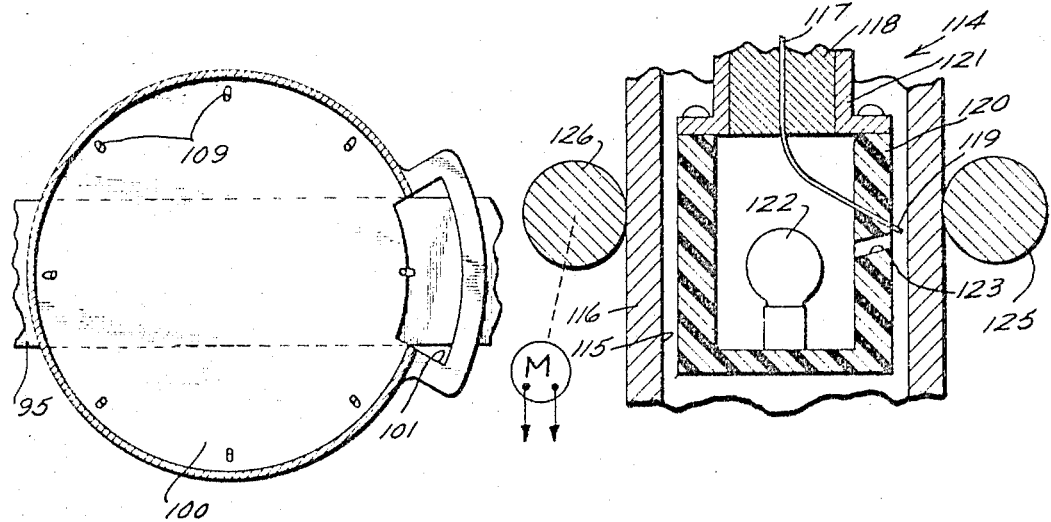

3,330,963
SPINNING LIGHT PIPE INSPECTION SYSTEM WITH LIGHT PIPE HAVING ONE END OFF THE PHOTOCELL AXIS
Donald T. O'Connor, Barrington, Ill., assignor to Magnaflux Corporation, a corporation of Illinois
Filed Mar. 4, 1964, Ser. No. 349,261
5 Claims. (Cl. 250—227)

This invention relates to a system for the automatic scanning and inspection of materials or articles by measuring the light transmitted through or reflected or emanated by an incremental portion thereof. The system of this invention is highly sensitive and accurate, very reliable and permits the inspection to be carried out at a high rate of speed.

The system has other applications but is particularly advantageous in the inspection of the spherical surfaces of small steel balls of the type used in ball bearings. Visual inspection of such balls is very slow and unreliable due to operator fatigue. Various automatic systems have been proposed using lens and mirror arrangements but such have not been entirely satisfactory due to the necessity of a high degree of precision, alignment and balancing problems and other difficulties, such that equipment operative to produce acceptable results would be highly expensive.

This invention utilizes a light pipe which is a thin elongated member or fiber which will efficiently transmit light from one point to another, and preferably is in the form of a bundle of fibers which permits the pipe to be formed into a desired configuration with curves therein while obtaining a high efficiency of light transmission.

According to this invention, an automatic inspection system is provided using the rotating light pipe having one end on the axis of rotation and adjacent the sensing surface of a stationary photo-electric sensor and having an opposite end spaced from the axis of rotation and located adjacent a surface to be inspected.

With this arrangement, light from a relatively small incremental area of the inspected surface is efficiently transmitted to the sensor where it can be accurately measured. Since the light pipe is light in weight, it can be rotated at relatively high speeds with alignment, balancing and vibrational problems being minimized. No expensive and cumbersome lenses, mirrors or other optical devices are required. At the same time the spacing and angular relation between the light pipe and the surface to be inspected can be adjusted to obtain optimum results.

In one application of the invention, a plane surface is scanned, the axis of rotation of the light pipe being normal to the surface and the light being positioned to receive light from the surface, either reflected light or light passed through the article or material being inspected, in the case of transulcent or transparent material such as sheets of plastic or paper.

In another application, an internal surface such as a cylindrical surface is scanned by aligning the axis of rotation of the light pipe with the axis of the cylindrical surface, and positioning the light pipe to receive light reflected from the surface. In this arrangement, relative axial movement may be effected between the article and the spinning light pipe to scan the surface.

In a further application, an external spherical surface is scanned by aligning the axis of rotation with the center of the spherical surface, the light pipe being positioned to receive light reflected from the surface. In this application, the light-receiving end of the light pipe may preferably be positioned in an equatorial plane and scanning may be accomplished by rotating the spherical surface about an axis transverse to the light pipe axis. This arrangement is particularly advantageous in the automatic inspection of the surfaces of bearing balls, in that the light pipe can be continuously rotated at a high rate of speed, and it is not necessary to accelerate each ball to a high rate of rotational speed and then decelerate the ball, as required in other systems. The ball need only be slowly rotated about an axis transverse to the rotational axis of the light pipe, for the scanning operation.

This system is particularly advantageous in that the balls can be readily fed automatically to and from the inspection station to obtain extremely rapid and yet highly reliable inspection.

Another important feature of the invention relates to the application of a concentrated illumination to a portion of the surface inspected, such as to produce maximum reflection to the light-receiving end of the light pipe, and to permit a very sensitive indication of flaws in the surface inspected. In accordance with this feature, a second light pipe is preferably provided, arranged to receive light from a light bulb mounted for rotation with the sensing light pipe. A slip ring assembly is preferably utilized for energizing the light bulb.

Still further features of the invention relate to the provision of amplifier, filter and threshold circuits for obtaining maximum sensitivity with respect to detection of defects, and to automatic operation of segregation means for separating satisfactory articles from unsatisfactory articles.

This invention contemplates still other objects, features and advantages which will become more fully apparent from the following detailed description taken in conjunction with the accompanying drawings which illustrate preferred embodiments and in which:

On the drawings:

FIGURE 1 is an elevational view of an automatic ball bearing inspection machine constructed according to the principles of this invention, electrical circuitry being illustrated diagrammatically;

FIGURE 2 is a sectional view taken substantially along line II—II of FIGURE 1;

FIGURE 3 is a sectional view taken substantially along line III—III of FIGURE 2;

FIGURE 4 is a cross-sectional view illustrating a modified form of inspection machine constructed according to the principles of this invention, designed for the inspection of sheet material;

FIGURE 5 is a sectional view taken substantially along line V—V of FIGURE 4; and FIGURE 6 is a sectional view illustrating another modified form of machine constructed according to the principles of this invention, designed for the interior inspection of pipe or similar articles.

As shown on the drawings:

Reference numeral 10 generally designates a ball bearing inspection machine constructed according to the principles of this invention. In the machine 10, balls 11 are fed from a hopper 12 onto a vertically reciprocable support or positioner device 13 which elevates each ball to an inspection position within a rotating scanning head 14.

After inspection, the ball is ejected from the positioner 13 to fall either into a "good" bin 15 or into a "bad" bin 16, depending upon the position of a pivotal deflector plate 17. The positioner 13 then receives another ball, and elevates it to the inspection position.

As shown in FIGURES 2 and 3, the inspection head 14 comprises a light pipe 19 which has a light-receiving end 20 facing an equatorial surface portion of the ball 11 to receive light reflected therefrom. The surface of the ball is preferably illuminated by means of a second light pipe 21, preferably larger, having one end 22 adjacent the surface of the ball 11 and an opposite end 23 positioned adjacent a light bulb 24 which is supported on the head 14. The light-receiving light pipe 19 extends generally radially outwardly from the end 20 and is then curved to extend radially inwardly and thence upwardly through a central opening in a vertical shaft 24. As shown in FIGURE 1, the upper end of the light pipe 19 is positioned adjacent the light-sensitive face 25 of a photo-multiplier tube 26 disposed within a light-proof housing 27.

In conventional fashion, the photo-multiplier tube 26 is connected to a high voltage supply 27 and is also connected to the input of an amplifier 28. The output of the amplifier 28 is connected through a filter circuit 29 to a threshold circuit 30, the output of which is applied to a storage circuit 31 having an output connected to a reject mechanism 32 which operates the deflector plate 17.

As shown in FIGURE 3, the light-receiving end 20 of the light pipe 19 and the light-emitting end 22 of the light pipe 21 are located at angles such as to obtain maximum transmission of light therebetween, using the reflection from the surface of the ball 11. Preferably, the angle between the axes of the end portions of the two light pipes should be less than 90°. Under such conditions, a very sensitive indication will be obtained, and comparatively small pits, cracks or other defects in the surface of the ball 11 will produce large changes in the output of the photo-multiplier tube.

The scannning head is preferably rotated at a quite high velocity, so that flaws will produce sharp pulses in the output of the fall out multiplier tube 26. The filter circuit 29 has a pass-band such as to provide maximum response to flaws of the size and character which it is desired to detect, and to discriminate against extraneous signals.

The scanning head comprises a block 34 for supporting end portions of the light pipes 19 and 21 in proper relation to the ball 11, block 34 being secured by a screw 35 to a radial wall portion 36 of a support member 37 having a cylindrical wall portion 38 and having a hub portion 39 fixedly fitted onto the lower end of the shaft 24. Screw 35 may extend through a radial slot in the wall 36, to permit radial adjustment of the position of the ends of the light pipes, to accommodate balls of different sizes, and to obtain maximum sensitivity.

The radial wall portion 36 also carries a bracket 40 for supporting the face 23 of the light pipe 21 in proper relation to the light bulb 24. A base 41 for the light bulb 24 is supported on the outside of the cylindrical wall portion 38, and has terminals which are connected through wires 42 to a slip ring assembly 43 carried on the shaft 24, and including conductive rings engaged with brushes carried by a fixed support 44. The brushes are connected to a suitable voltage source, not shown, which should supply a constant voltage. The slip ring system should provide a constant resistance of minimum value. A carbon brush works well at high speeds while a Phosphor bronze brush generally works well at low speeds but may heat at high speeds to cause changes in light intensity. In a system for operation at a wide range of speeds, both types of brushes are preferably used.

The shaft 24 is journalled by suitable bearings in a sleeve 46 which is supported from a vertical frame member 47, which also supports the brush support 44. To rotate the shaft 24 and the inspection head 14, an electric motor 48 is supported on the vertical frame member 47 and has a pulley 49 drivingly connected with a pulley 50 on the shaft 24, through a belt 51. The upper end of the shaft 24 extends through a horizontal frame portion 52 which supports the light-proof housing for the photo-multiplier tube 26.

It is very important that vibrations be minimized, and the inspection head 14 and other rotating parts should be dynamically balanced, the frame should be rigid and the bearings such as to minimize any vibrations.

The positioner 13 comprises a pair of rollers 55 and 56 journalled for rotation on spaced horizontal axes between the pair of vertical side plate portions 57 and 58, and having central grooves 59 and 60 for receiving the ball 11. The rollers 55 and 56 carry friction roller portions 61 and 62, both of which are engaged with a friction wheel 63, affixed to and journalled by a shaft 64 between the vertical side plate portions 57 and 58.

One end of the shaft 64 is connected through a flexible drive shaft 65 to the output shaft of a variable speed reduction unit 66, which is driven from the output shaft 67 of an electric motor 68, and which has a lever 69 for adjustment of the output speed.

With this arrangement, the ball 11 is rotated about a horizontal axis at a relatively low speed, while the inspection head 14 is rotated at high speed, so that the entire spherical surface of the ball is inspected.

To eject a ball 11 from the positioner 13, a nozzle 71 is carried by the positioner 13 and is connected through a flexible tube 72 and through a coupling 73 to another flexible tube 74, coupling 73 being carried from the upper end of the speed reduction unit 66. Tube 74 is connected, as shown in FIGURE 1, through a valve 75 to a compressed air source 76, valve 75 being operated from and by an operator 77, at an appropriate time in the inspection cycle.

The positioner 13 is supported at the upper end of a vertical shaft 80, preferably rectangular, which is guided for vertical movement in suitable ways of a support structure 81, disposed on a horizontal frame member 82. The positioner 13 on its lower side carries a cam roller 82 which engages a cam 83 on a shaft 84 which is the output shaft of a gear reduction unit 85 having an input shaft connected to the output shaft 67 of the motor 68. The cam 83 operates to elevate the positioner 13 to an operative position as illustrated, and to maintain it in such position for a substantial length of time sufficient for the complete inspection of the entire surface of a ball. The cam 83 then operates to lower the positioner, at which time the ball may be ejected by a bias from the nozzle 71. In the fully lowered position of the positioner 13, another ball is moved by gravity into position thereon.

To energize the valve operator 77, a micro-switch 87 on the frame member 82 is engageable by a cam 88 on the shaft 84. Switch 87 also operates the storage circuit 31 which may have any desired design but may, for example, comprise a flip-flop triggered to a set position by any signal output from the threshold circuit 30, and to be reset by a signal from the switch 87, a signal being then applied to the reject mechanism 32, if a defect signal has been stored from the inspection portion of the cycle.

The frame member 82 which supports the positioner 13 and associated mechanism, is preferably adjustable relative to a main frame member 90, by means of adjustment knobs 91 and 92, to permit accurate centering of the ball 11 relative to the inspection head during operation. Knob 91 adjusts the position in one horizontal direction, while knob 92 adjusts the position in a transverse horizontal direction.

Referring to FIGURES 4 and 5, reference numeral 94 generally designates a modified system constructed according to the principles of the invention, designed for the inspection of sheet material 95 which is supported on a plate 96 for movement thereover, and which passes between a pair of rollers 97 and 98, roller 98 being driven by motor 99 as diagrammatically illustrated.

A fixed plate 100 is disposed over the sheet material 95 and has a slot 101 therein through which the inspection is performed. In particular, an inspection head 102 is provided which comprises a support member 103 having the radial wall portion 104 and a hub portion 105 fitted on the lower end of a shaft 106, shaft 106 being supported for rotation about a vertical axis in the same way that the shaft 24 is supported in the system of FIGURES 1–3.

A light pipe support member 107 is secured to the underside of the radial wall portion 104 and supports eight light pipes 108. Each of the light pipes 108 extends from the upper end of the shaft 106, adjacent the face of a photo-multiplier tube, through the central opening of the shaft 106, thence radially outwardly and thence angularly downwardly to a light-receiving end 109, adjacent the upper surface of the fixed plate 100. As the ends 109 pass over the slot or opening 101 with rotation of the scanning head, a surface portion of the sheet 95 is scanned. The light pipes 108 are arranged in equi-angularly spaced relation, the ends being spaced apart through an angular distance of 45°, and the slot or opening 101 also has an arcuate length of 45°, so that only one light pipe is effective in scanning at any one time.

A lamp 110 is provided to illuminate the surface area of the sheet 95 which is exposed through the opening 101, at an angle such that light is reflected from the upper surface of the sheet 95 and to the light-receiving end 109 of the light pipe.

The system 94 may also be used in inspection of sheets of light-transmitting material, either translucent or transparent materials, by energizing a second lamp 111 positioned below the support plate 96 and arranged to project light upwardly through an opening 112 in the plate, to pass through the sheet 95 and then to the light-receiving end 109 of the light pipe.

FIGURE 6 illustrates another form of system 114 constructed according to the principles of this invention, designed for the inspection of the interior surface 115 of a pipe 116. In this arrangement, a light pipe 117 extends from the face of a photo-multiplier tube, not shown, through the central opening of a shaft 118 and thence radially and angularly outwardly to a light-receiving end 119 adjacent the interior surface 115 of the pipe 116. The light pipe 117, adjacent the end 119, is supported in an opening in a cup-shaped member 120 which is supported from the shaft 118 through a coupling member 121. A light bulb 122 is supported within the member 120 and projects light outwardly through an opening 123 to impinge on the interior surface 115 of the pipe 116 and to be reflected into the light-receiving end 119 of the light pipe 117. The lamp 122 is electrically connected to a slipring assembly which is like the assembly 43, 44 illustrated in FIGURE 1, and the support of the shaft 118 may be substantially the same as the support of the shaft 24 in the system of FIGURES 1–3.

To scan the interior surface 115 of the pipe 116 along its length, the pipe may be moved axially relative to the spinning light pipe. As diagrammatically illustrated, the pipe 116 may be positioned between rollers 125 and 126, and the roller 126 may be driven by a motor 127. The axial movement should be relatively slow as compared to the high speed spinning movement of the light pipe.

The arrangement of FIGURE 6, or an arrangement similar thereto, may be used for scanning the interior surfaces of other types of articles, such as bottles, for example.

It will be understood that modifications and variations may be effected without departing from the spirit and scope of the novel concepts of this invention.

I claim as my invention:

1. In a system for inspecting balls, means including a pair of rollers for supporting a ball for rotation about a horizontal axis, a photo-electric sensor having a sensing face in vertically spaced relation to the ball and arranged for developing an electrical signal in response to light impinged on said face, a first light pipe having one end adjacent said sensing face and having an opposite end adjacent the surface of said ball, a light source, a second light pipe having one end adjacent said light source and the opposite end thereof adjacent the surface of said ball, means for supporting said first light pipe for rotation about a vertical axis extending through said one end of said light pipe and the center of the ball and in spaced relation to said opposite end of said light pipe and for supporting said second light pipe and said light source for rotation about said vertical axis, and means for rotating said first and second light pipes and said light source about said vertical axis.

2. In a system for inspecting a surface, a photo-electric sensor having a sensing face and arranged for developing an electrical signal in response to light impinged on said face, a first light pipe having one end adjacent said sensing face and having an opposite end portion adjacent said surface and at an acute angle to a line norml to said surface, means for supporting said light pipe for rotation about an axis in fixed relation to said sensor extending through said one end of said light pipe and in spaced relation to said opposite end portion thereof, means including a light source and a second light pipe for projecting light toward said surface at an acute angle to said line normal to said surface to reflect light from said surface into said opposite end portion of said first light pipe, and means for rotating said first and second light pipes and said light source about said axis to scan said surface.

3. In a system for inspecting a surface, a photo-electric sensor having a sensing face and arranged for developing an electrical signal in response to light impinged on said face, a light pipe having one end adjacent said sensing face and having an opposite end adjacent said surface, and means for supporting said light pipe for rotation about an axis in fixed relation to said sensor extending through said one end of said light pipe and in spaced relation to said opposite end thereof, a light source, means including a second light pipe for projecting light from said light source toward said surface to reflect light from said surface into said opposite end of the first light pipe, and means for rotating said light source and said light pipes about said axis to cause scanning of said surface.

4. In a system for inspecting balls, means including a pair of rollers for supporting a ball for rotation about a horizontal axis, a photo-electric sensor having a sensing face in vertically spaced relation to the ball and arranged for developing an electrical signal in response to light impinged on said face, a first light pipe having one end adjacent said sensing face and having an opposite end adjacent the surface of said ball, a light source, a second light pipe having one end thereof adjacent said light source and the opposite end thereof adjacent the surface of said ball, means for supporting said first light pipe for rotation about a vertical axis extending through said one end of said light pipe and the center of the ball and in spaced relation to said opposite end of said light pipe and for supporting said second light pipe and said light source for rotation about said vertical axis, and means for feeding and removing balls to and from said ball supporting means.

5. In a system for inspecting an interior cylindrical surface comprising:
   a probe to be positioned within a cylinder of which the interior surface is to be inspected, said probe including:
   a shaft having one end extendable into said cylinder and an opposite end remote from said cylinder,
   a hollow housing mounted on said shaft at said one end, said housing having an aperture formed therethrough making an acute angle with the normal of said cylinder;

a light pipe passing through said shaft in axial alignment therewith and a portion of said light pipe extending through said one end of said shaft and into said housing and therefrom through said housing toward said cylindrical surface, said portion of said light pipe making an acute angle with the normal of said cylinder and with said aperture, and a light source mounted within said housing for emitting light through said aperture onto said cylindrical surface so as to be reflected from the surface toward the end of said light pipe passing through said housing, and means for moving said light pipe and said light source relative to the interior surface of the cylinder being inspected.

References Cited
UNITED STATES PATENTS

| | | | |
|---|---|---|---|
| 2,570,288 | 10/1951 | Todd | 250—219 |
| 2,902,151 | 9/1959 | Miles et al. | 250—223 |
| 3,192,391 | 6/1965 | Ressler | 88—1 |

RALPH G. NILSON, *Primary Examiner.*

M. ABRAMSON, *Assistant Examiner.*